United States Patent [19]

Harlow

[11] Patent Number: 4,826,725

[45] Date of Patent: * May 2, 1989

[54] MANUFACTURE OF LOW DENSITY, SINTERED POLYTETRAFLUORETHYLENE ARTICLES

[75] Inventor: Norman R. Harlow, Cornwall-on-Hudson, N.Y.

[73] Assignee: Carlisle Corporation, Buchanan, N.Y.

[*] Notice: The portion of the term of this patent subsequent to Jul. 16, 2002 has been disclaimed.

[21] Appl. No.: 86,180

[22] Filed: Aug. 14, 1987

Related U.S. Application Data

[63] Continuation of Ser. No. 718,850, Apr. 2, 1986, abandoned, which is a continuation-in-part of Ser. No. 552,496, Nov. 17, 1983, Pat. No. 4,529,564, which is a continuation-in-part of Ser. No. 410,491, Aug. 23, 1983, abandoned.

[51] Int. Cl.⁴ .......................... H01B 7/00; B29C 47/02
[52] U.S. Cl. ............................. 428/375; 174/110 FC; 264/127; 428/422
[58] Field of Search .................. 264/127; 174/110 FC; 428/375, 422

[56] References Cited

U.S. PATENT DOCUMENTS

3,260,774  7/1966  Harlow .............................. 264/123
3,953,566  4/1976  Gore .................................. 264/175

FOREIGN PATENT DOCUMENTS

921453   3/1963   United Kingdom ......... 174/110 FC
1136419  12/1968  United Kingdom ......... 174/110 FC

*Primary Examiner*—James Lowe
*Attorney, Agent, or Firm*—Brooks Haidt Haffner & Delahunty

[57] ABSTRACT

A method for extruding, stretching and sintering polytetrafluoroethylene in a single pass operation to form tubular articles of low density, low matrix tensile strength, sintered polytetrafluoroethylene and articles such as electric cable having low density, low matrix tensile strength sintered polytetrafluoroethylene insulation applied about a conductor by such method. A high reduction ratio rating polytetrafluoroethylene powder with a lubricant is extruded by an extruder having a low reduction ratio, and the extrudate is heated to remove the lubricant and is stretched prior to sintering of the polytetrafluoroethylene tube which is held in its previously stretched state during sintering.

16 Claims, 2 Drawing Sheets

FIG. 1.
FIG. 2.
FIG. 3.
FIG. 4.
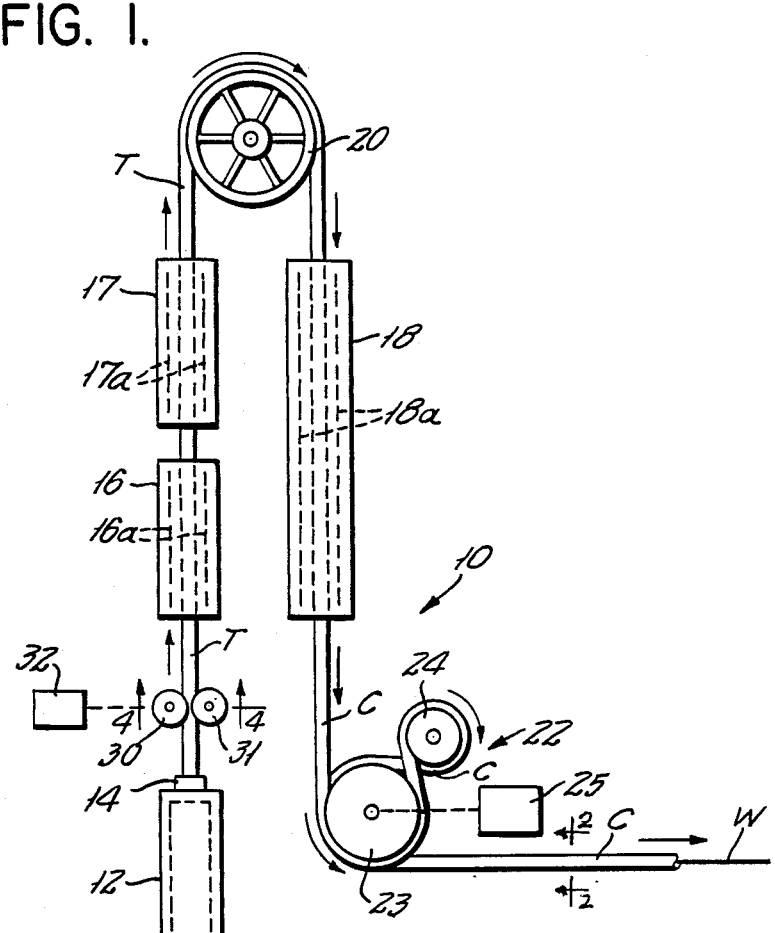
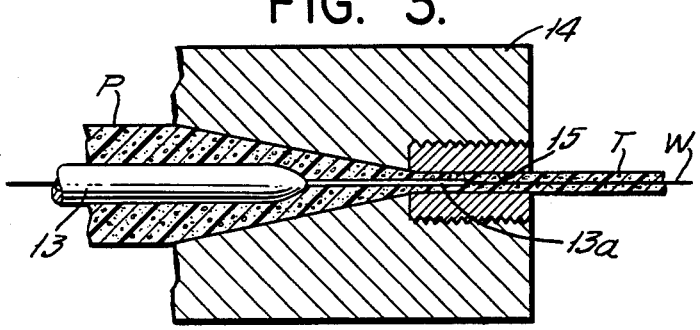
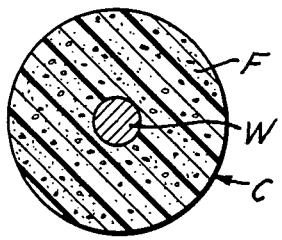
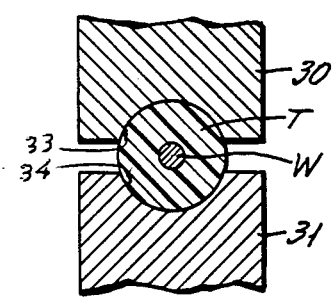

MANUFACTURE OF LOW DENSITY, SINTERED POLYTETRAFLUORETHYLENE ARTICLES

This application is a continuation of application Ser. No. 718,850 filed Apr. 2, 1986, and now abandoned, which is a continuation-in-part of application Ser. No. 552,496, filed Nov 17, 1983 now U.S. Pat. No. 4,529,564 which, in turn, is a continuation-in-part of application Ser. No. 410,491 filed Aug. 23, 1983 and now abandoned.

BACKGROUND OF THE INVENTION

This invention relates to tetrafluroethylene polymers and in particular to manufacture of articles comprising microporous, that is, low density, sintered polytetrafluoroethylene. The invention provides a simple process for forming elongated articles of low density, sintered tetrafluoroethylene polymers having a relatively low tensile strength, for example, in the form of electrical insulation disposed about a conductive core, to produce a microporous polytetrafluoroethylene article, such as polytetrafluoroethylene insulated cable characterized by improved strippability of the insulation.

"Porous" sold dielectric materials have found favor as insulation for electric cables used in communications and in the computer industry because the reduction in dielectric constant produced by the incorporation of air in a solid dielectric greatly improves the electrical characteristics of cable made with such insulation. Moreover, the porosity introduced into the dielectric reduces the weight of the cable and concommitently its cost. The latter is a particularly important consideration in the case of relatively expensive dielectric materials such as polytetrafluoroethylene. The lower dielectric constant of "porous" dielectrics also reduces the overall size of insulation required to achieve a given characteristic cable impedence.

Low density, sintered polytetrafluoroethylene which is microprocess has heretofore been described in Japanese Patent Publication No. 13,560/67 and U.S. Pat. 3,953,566, for example. It has been made by a process of stretching and consequently is also called "stretched" or "expanded" polytetrafluoroethylene. As described in the literature, the product is made by extruding a paste of extrusion grade unsintered polytetrafluoroethylene admixed with an extrusion aid. The extrusion aid is removed from the extrudate after extrusion, and the product is then stretched in one or more directions and sintered while holding it in stretched condition. Stretching causes the polymer in effect to decrease in density without significant decrease in dimensions transverse to the direction of stretching. Stretched polymer can be produced which is thus increased in volume by several hundred percent of its original volume, introducing micropores such that the finished product has "porosity" with the pore volume often accounting for a major portion of the total product volume. Increases in tensile strength of the product in the direction of stretch are achieved, which become substantial after sintering while holding it in stretched condition.

The extrusion process itself is conventional as practiced in the industry and called "paste extrusion". Typically extrusion aid is admixed with the extrusion grade unsintered polytetrafluoroethylene powder in a proportion of 10 to 35% by volume. Preferably, the extrusion aid is V.M. & P. naptha and is employed in 18% by volume. The resultant paste, which is formed by tumbling or a similar procedure, is pressed into a preform shaped to be received in the barrel of a ram extruder. In the extruder, the preform is forced through a die with substantial reduction in cross-section. Sheeting dies and calendaring steps are commonly employed in conjunction with extrusion of the paste in order to obtain flat stock and in order to promote biaxial orientation of the fibers which are produced when unsintered polytetrafluoroethylene is extruded. Paste extrusion is also employed in manufacture of polytetrafluoroethylene insulated wire.

In producing low density, sintered polytetrafluoroethylene, the extrusion aid is removed from the extruded product by heating at mild temperatures to drive off the extrusion aid or by solvent leaching.

The product is then stretched in at least one direction, for example, by passing it in tape form over a roll travelling at a given speed and then to a capstan travelling at a faster speed such that the product is placed under tension and stretches between the roll and capstan. The stretching in length of the tape which takes place between the roll and capstan is not accompanied by any significant reduction in cross-section of the tape, thus, in effect increasing the volume and lowering the density of the material by stretching the spaces between the ibrous particles of polytetrafluoroethylene as well as elongating the fibers themselves.

The resulting low density polytetrafluoroethylene is soft and upon heating without restraint shrinks losing the microporosity achieved by stretching. It has been found, however, that if low density, unsintered polytetrafluoroethylene is heated to sintering temperatures while restrained in stretched condition the porosity becomes set and is retained after cooling with a significant increase in tensile strength of the product in the direction of the stretch over the tensile strength of sintered product which has not been stretched.

In the prior art processes, the resulting low density sintered polytetrafluoroethylene has a relatively high longitudinal tensile strength and longitudinal matrix tensile strength which is undesirable for various applications particularly, for insulation for wire or cable. Thus, with insulated wire or cable, adequate tensile strength is provided by the wire within the insulation, and it is desirable to have a low longitudinal tensile strength for strippability reasons. Thus, when terminating a wire or cable, a cut is made in the insulation, but such cut does not extend to the outer surface of the wire in order to avoid damage to the wire. Thereafter, the portion of the insulation to be removed is removed to bare the end of the wire, the insulation parting at the cut. The ease with which such portion of the insulation can be removed, or stripped, depends upon, and is an inverse function of the tensile strength of the insulation. Similar considerations apply to other articles of sintered, low density polytetrafluoroethylene which do not require a high tensile strength.

Low density, sintered polytetrafluoroethylene made as described above has been used in the manufacture of insulated cable by making low density sintered tape as described above, and then winding the tape helically with overlap about a conductor. Typically several layers of helical windings are positioned over the conductor. While the final insulated cable has the advantages of a "porous" dielectric in terms of significant weight reduction, size reduction and the like, the product has several drawbacks. The surface, naturally, is rough because of overlap in applying the helical servings of polytetrafluoroethylene tape. Consequently, it cannot be color coded or otherwise marked as well as might be desired. The compression on the inner layers of tape caused by the tension imposed during winding the outer layers results in partial collapse of the inner layers (increase in density) which makes it difficult to control the impedance of the cable. Also the cable does not strip cleanly. Crossed fibers from the biaxially oriented wrapped tapes resist clean breakage. Where the tapes adhere to each other, the dielectric is discontinuous at tape boundaries.

OBJECTS OF THE INVENTION

It is an important object of the invention to provide a process for the manufacture of elongated, low density, sintered, polytetrafluoroethylene articles, such as polytetrafluoroethylene insulated wires or cables and tubes, which have a longitudinal tensile strength, apparent and matrix, which is relatively low compared to such tensile strength of such articles obtained with prior art processes.

It is a further object of the invention to provide a wire or cable covered with a layer of low density polytetrafluoride which layer has a relatively low tensile strength and which has a signal propagation velocity of at least 75% of the speed of light.

It is a further object of this invention to provide a process for the manufacture of elongated, low density, sintered polytetrafluoroethylene products, such as polytetrafluoroethylene insulated cables, in which the polytetrafluoroethylene is continuous and has a homogeneous, uniform density throughout. Further, the surface of, the polytetrafluoroethylene product is smooth facilitating electrolysis plating techniques, and, when applied to cable as insulation the product can be cleanly stripped without pulling crossed fibers or the like.

It is a further object of this invention to provide a simple process for the production of such low density sintered products in an integrated operation in which the extrusion, extrusion aid removal, stretching and setting operations are carried out in a single pass arrangement.

It is a further object of this invention to provide a process for manufacturing electric cable insulated with low density sintered polytetrafluoroethylene in which the stretching of the insulation and its application to the cable core are carried out simultaneously.

SUMMARY OF THE INVENTION

These and other objects of this invention are achieved utilizing a manufacturing process essentially the same as that conventionally used in paste extrusion, in that the paste is conventionally preformed and thereafter extruded in a process in which the extrudate is passed through an extrusion aid removal zone and the resulting product is then passed to a sintering zone in a single pass operation. In accordance with the present invention, however, the product is drawn through the sintering zone at a rate of linear speed substantially in excess of the linear speed of extrusion, that is, the speed determined by volumetric rate of extrusion divided by the cross-sectional area of the die exit. In order to carry out this operation it is also necessary to restrain or otherwise control the speed of extrusion at the die exit such that the extrudate is extruded at the same volumetric rate as it is fed to the die. In other words, pulltrusion is avoided.

The process of the present invention also differs from prior art processes in that polytetrafluoroethylene powders known in the art as high reduction ratio polytetrafluoroethylene powders, i.e, a reduction ratio rating of at least 1000/1, are employed to form the preform, and the material of the preform is extruded at a low reduction ratio, i.e. at less than 1000/1 and preferably less than 800/1. It has been found from tests that when such a high reduction ratio polytetrafluoroethylene powder is extruded at a reduction ratio less than 1000/1, stretched and sintered, the matrix tensile strength of the resulting article is relatively low.

As the extruded product is extruded from the die exit at extrusion speed and passes to the sintering zone through which the product is drawn at a greater speed, the product is stretched to accommodate the difference in speeds as well as being drawn through the extrusion aid removal zone. This stretch desirably is made to occur after extrusion aid removal. Generally stretching is predetermined to occur after extrusion aid removal by passing the unsintered product through a heated stretching zone after the extrusion aid removal zone and prior to the sintering zone in which the temperature of the product is raised above that in the extrusion aid removal zone such that the tensile strength of the product is lower than in the extrusion aid removal zone. When the extrusion aid is a volatile material removed by heat, the unsintered polytetrafluoroethylene product leaving the extrusion aid removal zone should be heated in the stretching zone to a temperature higher than that required for extrusion aid removal but less than 560° F. (293° C.) at which stretching becomes uncontrollable. Preferably temperatures of the product in the stretching zone should be between 250° F. (121° C.) and 560° F. (293° C.).

Extrusion aid removal is accomplished in a conventional manner. While this conceivably might be by solvent leaching it is more practical to remove a volatile extrusion aid, such as naptha, by the use of heat. Heat can be supplied by the use of a hot air furnace or by the use of an electrical resistance heater such as CALROD electrical resistance heater elements or lamps. Whatever, the temperature of the extrudate should be raised sufficiently high to ensure a volatilization of most of the extrusion aid in the length of time that the extrudate remains in the extrusion removal zone. The temperatures which must be achieved are, of course, dependent upon the thickness of the extrudate as well as the extrusion aid employed. Oven temperatures of 560° F. (293° C.) are typical when removing an extrusion aid such as V.M. & P. naphtha having a boiling range of about 246°–290° F. (119° C.-143° C.). With the use of volatile extrusion aids the heat of volatilization tends to keep the temperature of the paste at or below the boiling temperature of the extrusion aid until it is almost entirely removed.

The heat required to promote stretching can be supplied in similar fashion, and can be provided from the standpoint of apparatus by simple extension in length of the vaporizing oven used for removal of volatile extrusion aid. Oven temperatures of 500° F. are again appropriate.

After extrusion aid removal and stretching the low density extrudate must be passed through a sintering zone at which the temperature of the low density unsintered polytetrafluoroethylene is raised above the so-called sintering temperature, which normally is 327° C. (620.6° F.). Oven temperatures on the order of 700° F.

are ordinarily satisfactory to achieve sintering temperature under typical conditions.

In drawing the product through the sintering zone it is necessary that the forces placed on the product to draw it should be applied in a manner that the product does not stretch during the gel state in the sintering zone. The tensile strength of polytetrafluoroethylene decreases as a function of temperature. At 500° F. the tensile strength is approximately one-half that at room temperature.

Thus, in accordance with this invention, tension is relieved on the product as it passes through the sintering zone by drawing the unsintered product after extrusion aid removal and stretching before entering the sintering zone at the same linear speed as the sintered product is drawn from the sintering zone. Thus, the only tension placed on the product in the sintering zone is essentially that required to keep it in stretched condition.

The stretch of the polytetrafluoroethylene product which occurs is equal in length per unit time to the difference in linear rate of speed of the extrudate at the die exit and that of product passing through the sintering zone. If the linear rate of extrusion is 50 feet per minute and the drawing rate is 100 feet per minute, the stretch is 50 feet per minute or 100%. No loss in volume occurs as a result of extrusion aid removal, and no significant decrease in dimensions transverse to the direction of stretch occurs. It should be understood that normally in sintering, a polytetrafluoroethylene product which has been formed by a process involving paste extrusion there is an increase in density from about 1.8 to about 2.2 with accompanying dimensional decrease. This increase still occurs in the process of this invention. What is to be noted is that no significant dimensional decrease attributable to stretch occurs.

The process of forming low density sintered polytetrafluoroethylene articles in accordance with this invention is particularly adaptable to the formation of tubing and, in particular, to the application of low density sintered polytetrafluoroethylene about a wire conductor in the manufacture of electric cable. Conventional in-line extrusion equipment for application of polytetrafluoroethylene to a conductive core is utilized with the additional difference, however, that an opening for the core must be formed such that, as the extrudate and core exit the die the conductive core can slide within the extrudate. In conventional paste extrusion about a metallic wire conductor, no such opening is formed and the extruded material is supplied with pressure to the outer surface of the conductive core. The formation of the necessary opening in accordance with this invention is accomplished using conventional extrusion apparatus for extruding polytetrafluoroethylene paste about a central conductor. In this apparatus, a guide tube having a needle tip is employed to pass the conductor through the center of the preform out of contact with the paste until close to the point of entry of the conductor and paste into the land of the die. Conventionally the conductor and extruding paste are brought together as their speeds become approximately equal.

In extruding and stretching polytetrafluoroethylene about a conductor in accordance with this invention the needle tip is adjusted in position such that the tip is in the land of the die. In such position an opening is formed in the extrudate through which the central conductor slides. (The central conductor travels at the final, speed of the sintered product which usually is greater and in excess of the extrusion speed).

BRIEF DESCRIPTION OF THE DRAWING

For a more complete understanding of the practical applications of this invention, reference is made to the appended drawing in which:

FIG. 1 is a schematic elevation view of an apparatus designed to extrude, stretch and sinter a low density polytetrafluoroethylene covering about a cable core;

FIG. 2 is a cross-section of the completed cable taken at line 2—2 in FIG. 1;

FIG. 3 is a longitudinal section through a portion of the apparatus taken at line 4—4 in FIG. 1;

FIG. 4 is a fragmentary cross-section of another portion of the apparatus shown in FIG. 1.

DETAILED DESCRIPTION OF THE INVENTION

Figure 5:
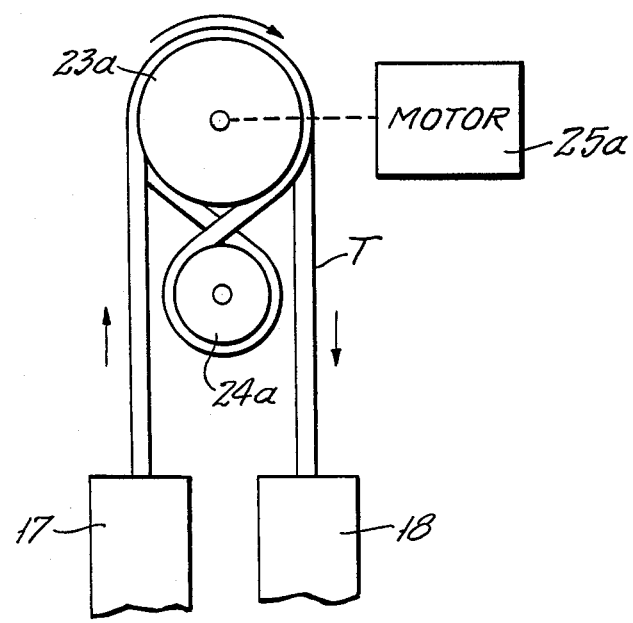
FIG. 5 is a fragmentary schematic, elevation view illustrating a modification of the apparatus shown in FIG. 1 for the production of tubing without a wire therein.

Except for FIG. 5, the drawings illustrate the apparatus and cable illustrated and described in said applications Ser. Nos. 552,496, now U.S. Pat. No. 4,529,564 and 410,491 now abandoned and the apparatus and its operations are described hereinafter.

Referring more specifically to FIG. 1, the reference numeral 10 indicates the overall extrusion apparatus utilized to extrude polytetrafluoroethylene about a conductive core in the formation of low density sintered polytetrafluoroethylene insulation in accordance with this invention. Apparatus 10 basically includes an extruder 12 having a die 14, a vaporizing oven 16, a stretching oven 17 and a sintering oven 18.

Extruder 12 is a conventional ram extruder for inline extrusion of polytetrafluoroethylene extrusion paste, hereinafter described, shaped into an annular cylindrical preform P. Conductor wire W is fed through the center of the barrel of extruder 12 in which preform P is located and out through die 14 located at one end of extruder 12.

Extruder 12 is vertically positioned with die 14 at its upper end, such that the conductor W and extruded tubing T of extrusion paste which overlies conductor W are drawn upwardly through tubular vaporizing oven 16 and tubular stretching oven 17 which are aligned vertically above extruder 12. For practical reasons, sintering oven 18, which is also tubular, is positioned parallel to vaporizing oven 16 and stretching oven 17. For this reason, as tubing T and wire W issue from the upper end of oven 17, they are carried around a turnaround wheel 20 to reverse the direction of travel of the extruder tubing T and wire W and also to offset the path of travel to bring tubing T and wire W vertically downward through the center of sintering oven 18.

Ovens 16, 17 and 18, which are convection ovens, are provided with internal electrical resistance heating units 16a, 17a, and 18a, respectively, which can be controlled to produce internal oven air temperatures in excess of 700° F. Typically, ovens 16 and 17 are operated at 500° F., and oven 18 is operated at 700° F. such that volatile extrusion aid in the extrusion paste is driven off in oven 16, and the remaining polytetrafluoroethylene is super heated to 250°–450° F. in oven 17 and is sintered in oven 18.

At the lower end of sintering oven 18 the low density sintered polytetrafluoroethylene insulated cable C taken from oven 18 is drawn by a fleeter capstan 22. Capstan 22 has a drum 23 and fleeter wheel 24, drum 23 being driven by a motor 25. Drum 23 and wheel 24 are mounted to rotate on parallel axes with their surfaces spaced apart slightly. Cable C is wound in FIG. 8 fashion in peripheral grooves in drum 23 and wheel 24 and then taken off to a storage reel or the like.

Apparatus 10, as described above, except for the addition of oven 17, is conventionally employed in the extrusion of polytetrafluoroethylene coatings about wire conductors. The rate of speed at which the final insulated conductor C is drawn by capstan 22 is conventionally the same as the extrusion rate of paste in the form of tubing T, and of course, is the same as the speed of wire W.

In order to adapt the conventional equipment to produce low density sintered polytetrafluoroethylene insulated cable in accordance with this invention the apparatus is modified by adding a pair of pinch rolls 30 and 31 which are driven in counterrotation by a motor 32. Rolls 30 and 31 are peripherally grooved, as indicated by the reference numerals 33 and 34, respectively, to receive the exterior of extruded tubing T in the nip formed between rolls 30 and 31. Motor 32 is connected to drive rolls 30 and 31 at the same counterrotating speeds such that the confronting surfaces of grooves 33 and 34 also travel at the same speed in the same direction in the nip between rolls 30 and 31.

Rolls 30 and 31 are positioned adjacent the exit of die 14 between die 14 and vaporizing oven 16 and are aligned with the path of travel of extruded tubing T such that tubing T is carried between grooves 33 and 34 which lightly contact the surface of tubing T, as can be seen in cross-sectional view FIG. 4, to nip and control the speed of tubing T. The pressure, however, mus be less than would restrain the relative movement of wire W and tubing T.

In the conventional extruder 12, there is normally a long sleeve 13, known as a guide tube, sized to receive the conductor core to be coated, in this instance wire W, and to carry it through the center of preform P. Sleeve 13 normally terminates with a needle tip 13a within die 14 short of the land 15 of the die. Until wire W reaches land 15, its rate of speed is usually greater in excess of the rate of speed of the paste from preform P as the latter is extruded toward die 14. Sleeve 13 functions to permit the relatively higher speed of wire W to be unimpeded by the slower movement of paste.

In accordance with this invention, however, the sleeve 13 is also utilized to form an opening in the extruded paste as the latter enters land 15 thus forming a tubing T of the extruded paste and functioning as a mandrel, so to speak. As seen in FIG. 3, which is a longitudinal section through the die, needle tip 13a of sleeve 13 is located well within die land 15, and, because of its slightly greater thickness than wire W, forms a bore in tubing T which has a diameter greater than the outside diameter of wire W.

In forming low density sintered polytetrafluoroethylene insulated cable in accordance with this invention, the peripheral rate of rolls 30 and 31 is the same as the linear speed of extrusion of tubing T. The peripheral speeds of drum 23 and wheel 24 of capstan 22, however, are at a rate substantially in excess such that cable C is drawn at a rate substantially exceeding that of extrusion. Turnaround wheel 20 is normally free to turn as drawn by tubing T in contact with it. The tension on tubing T is sufficient to bind tubing T against wire W such that no relative movement between tubing T and wire W at the location of wheel 20 can take place. Wheel 20 thus turns with a peripheral speed determined by the speed of wire W, and hence of capstan 22. Tubing T is thus stretched between pinch rolls 30 and 31 and turnaround wheel 20 by an amount percentage-wise equal to the percentage difference in speeds of rolls 30 and 31 and turnaround wheel 20.

While in the illustrated apparatus pinch rolls 30 and 31 are used to control the linear speed of tubing T as it is drawn from die 14, it has been found that rolls 30 and 31 are not necessarily needed. In many cases the linear speed of tubing T exiting die 14 can also be controlled satisfactorily by extending needle tip 13a further into land 15 of die 14 such that the frictional resistance between land 15 and needle tip 13a imposes the drag on tubing T necessary to control its linear speed of exit from die 14. This has been found effective with solid (single strand) conductor wires W, but has not worked well with stranded wires W.

Tubing T is thus stretched while under tension imposed by the difference in linear speeds of tubing T between pinch rolls 30 and 31 or die 14 and wheel 20. This introduces porosity which is set upon sintering in oven 18. The degree of porosity achieved is directly proportional to the degree of stretch. Thus, if the cable is drawn by capstan 22 at a linear rate about wheel 20 equal to twice the speed of extrusion and wire W is allowed to feed to extruder 12 at twice the rate of extrusion, the resultant cable C, as depicted in FIG. 2, is insulated with polytetrafluoroethylene insulation F which has 50% volume of micropores.

When the tubing T is extruded over the wire W, the stretch is determined by the feed speed of the relatively unstretchable wire W. If it is desired to make tubing T without a wire W inside thereof, the wire W and the opening in the needle tip 13a through which the wire W passes may be omitted. To provide the stretching of the tube T, a capstan, like the capstan 22 and comprising the drum 23a and a wheel 24a, may be substituted for the wheel 20 as illustrated in FIG. 5. The drum 23a is driven by a motor 25a at a speed slightly less than the speed at which the drum 23 is driven by the motor 25 so that the tube T is maintained rectilinear as it travels from the drum 23a to the drum 23 without any significant stretching of the tube T as it travels between the drums 23a and 23.

It has been found that preheating of the extruder and of the die to 200° F. (93° C.) to 350° F. (177° C.) raises the temperature of the paste to above room temperature and promotes smooth cell structure. Preheating, however, should be limited, as temperatures of the paste above about 200° F. results in reduction of final diameter and hence, lower porosity of the final product. While evaporation of extrusion aid serves to keep the temperature of the extrudate below the boiling point of the extrusion aid, such evaporation cannot take place in the highly pressurized environment of the extruder.

The reduction ratio at which a polytetrafluoroethylene powder can be extruded depends on the manner in which it is manufactured. The extruder reduction ratio is determined by the following formula:

$$RR = \frac{A_C - A_R}{A_L - A_O}$$

where:
- $A_C$ = the cross-sectional area of the extruder barrel which has a diameter substantially equal to the outer diameter of the polytetrafluoroethylene preform P.
- $A_R$ = the cross-sectional area occupied by the extruder guide tube 13 (ignoring the area of any small opening therein).
- $A_L$ = the cross-sectional area of the die 14 opening.
- $A_O$ = the cross-sectional area of the bore (if any) of the article which area is equal to the cross-sectional area of the conductor or wire W when the polytetrafluoroethylene is extruded on a wire W as shown in the drawings.

With the type of extrusion described in which the length of a wire which can be insulated is limited by the volume of the preform, it usually is desirable to have a high extruder reduction ratio in order to be able to produce long lengths of insulated wire. If a polytetrafluoroethylene powder rated at a low reduction ratio were to be used in an extruder with a high reduction ratio, the high extrusion pressures involved would damage the extruder. Furthermore, the polytetrafluoroethylene fibers are fractured causing insulation surface roughness and non-uniform dielectric properties along the length of the insulated wire. Accordingly, it is conventional practice to use polytetrafluoroethylene powders having high reduction ratio ratings, i.e. greater than 1000/1 and an extruder with a high reduction ratio, i.e., greater than 1000/1, when extruding insulation over a conductor or wire. After stretching and sintering, the resulting insulation has a high matrix tensile strength, e.g. greater than 10,000 p.s.i.

Contrary to the conventional practice, the process of the present invention uses a polytetrafluoroethylene powder of a reduction ratio rating of at least 1000/1, and preferably, at least 2500/1, and an extruder having a reduction ratio of substantially less than, e.g. preferably not more than one-fourth of, the reduction ratio rating of the powder and not greater than tetrafluoroethylene preform, and an article having a relatively low tensile strength is obtained. Preferably, the extruder reduction ratio is in the range from 200/1 to 800/1, and the matrix tensile strength of the resulting polytetrafluoroethylene is in the range from 2000 p.s.i. to 8000 p.s.i. but may be as low as 900 p.s.i. and as high as 12,000 p.s.i. The reduction ratio ratings of the polytetrafluoroethylene powders which are used in the process of the invention are always substantially higher than the extruder reduction ratio so that when the extruder reduction ratio is low the powder reduction ratio rating may be at the low end of the range but as the extruder reduction ratio increases, the reduction ratio rating of the polytetrafluoroethylene powder should be increased. Preferably, the extrusion pressure on the polytetrafluoroethylene mass in the extruder is in the range from 2000–4000 p.s.i. With lower pressures the extruded product does not properly hold together and with higher pressures, e.g. above about 6000 p.s.i., there is an undesirable increase in matrix tensile strength of the product and/or a breaking up of the extruded product.

As pointed out in said Pat. No. 3,953,566, the tensile strength of conventional extruded polytetrafluoroethylene after sintering, but without stretching, is generally considered to be about 3000 psi. While this is a relatively low tensile strength, it is desirable to improve the properties of the extruded product, particularly for electrical reasons, to increase the porosity of the product by stretching it. Thus, as the product is stretched, the porosity increases with increases in the amount of stretching. In the process of the invention, the extruded product is stretched at a low rate prior to sintering and may be stretched in the range from 20% to 600%. Preferably, the stretching is in the range from 100% to 400%, and the percentage of voids in the sintered product is at least 50%. As pointed out hereinbefore, the electrical characteristics of the sintered polytetrafluoroethylene are improved by increasing the porosity thereof. The signal propagation velocity of solid polytetrafluoroethylene is about 70% of the speed of light, and by increasing the porosity, in accordance with the invention, the signal propagation velocity in the sintered, porous polytetrafluoroethylene product can be as high as 93% of the speed of light. Preferably, the stretching amount is selected so that the signal propagation velocity is at least 75%, and preferably, 85–90%, in the product of the invention, and the density of the product is not greater than 1.9 g/cm$^3$ and preferably in the range of 0.45–1.9 g/cm$^3$.

It has been observed that the product produced with the process of the invention has an increased resistance to crushing as compared to wrapped insulation because the insulation fibers are oriented in one direction rather than in a plurality of directions as is the case with wrapped tape constructions.

The density, specific gravity, break strength, apparent tensile, time delay (Td), velocity of propagation (Vp) and impedance of the product produced by the process of the invention are determined in a conventional manner. The matrix tensile strength is calculated by multiplying the apparent tensile strength by the ratio of the specific gravity of solid polytetrafluoroethylene (2.15) to the specific gravity of the stretched and sintered product.

In the art, a polytetrafluoroethylene powder is considered to be a high reduction ratio powder when the ratio is at least 1000/1. Examples of such polytetrafluoroethylene powders which are commercially available are TEFLON T6C sold by E.I. duPont de Nemours & Co., Inc., and having a reduction ratio rating of about 3000/1, FLUON CD 076, CD 509 and CD 4 sold by ICI United States, Inc., Wilmington, Del. and having reduction ratio ratings of 2500/1, 3000/1, and 3500/1 respectively and Daikin F-201 sold by Daikin Kogyo Co., Ltd., Osaka, Japan and having a reduction ratio rating of up to 4000/1.

The industry has adopted standard tests for determining the reduction ratio rating of a polytetrafluoroethylene powder. One such test, which can be used to determine the reduction ratio rating of a polytetrafluoroethylene powder for the purposes of this invention, has been published by ICI Americas, Inc., Wilmington, Del. In this test, a billet of polytetrafluoroethylene is preformed in a press and then inserted in a Havelock hydraulic pressure extruder and extruded through a die where a string is obtained. The amount of pressure exerted to force the polytetrafluoroethylene through the die is its extrusion pressure.

Depending upon the grade of the polytetrafluoroethylene, various die openings may be used, giving different die reduction ratios. For example, the die openings may be as follows for polytetrafluoroethylene powders made and sold by ICI Americas, Inc.:

| Grade | Die Opening - diam. in. |
|---|---|
| CD 125 | 0.132 |
| CD 126 | 0.078 |
| CD 123 | 0.069 |
| others | 0.050 |

The extrusion pressure at an extruder reduction ratio of 900/1, as well as other factors, such as appearance, physical properties, etc., determines the reduction ratio rating of a polytetrafluoroethylene powder, and the pressures at other reduction ratios may be converted to the pressure at a reduction ratio of 900/1 by multiplying by a known factor, e.g. the pressure at a reduction ratio of 470:1 will give the pressure at a reduction ratio of 900/1 if it is multiplied by 1.5.

In such test, the die has an included angle of 20° and the preform includes 16% by weight of ISOPAR H lubricant. The ram speed is 0.8 in./min.

Typical reduction ratio ratings for commercially available polytetrafluoroethylene powders are as follows:

| Properties | [1]CD1 | [1]CD-014 | [1]CD-076 | [1]CD 509 | [1]CD-4 | [2]F-201 | [3]T6C |
|---|---|---|---|---|---|---|---|
| Nominal extrusion pressure-psi | 14,000 | 11,000 | 9,000 | 8,000 | 7,000 | 7,000 | — |
| Reduction ratio rating | 500 | 800 | 2,500 | 3,000 | 3,500 | 4,000 | 3,000 |

Note [1] - grades of polytetrafluoroethylene powder sold by ICI United States, Inc., Wilmington, Del.
Note [2] - grade of polytetrafluoroethylene powder sold by Daikin Kogyo Co., Ltd., Osaka, Japan
Note [3] - grade of polytetrafluoroethylene powder sold by E.I. duPont de Nemours & Co., Inc.

The extrusion pressure which may be used depends upon the characteristics of the polytetrafluoroethylene powder. If the extrusion pressure is too low, the physical strength of the extrudate is too low for processing purposes, and if the extrusion pressure is too high, the extrudate is irregular and breaks up. Similarly, if an attempt is made to extrude a low reduction ratio polytetrafluoroethylene powder with a high reduction ratio extruder, excessive pressures usually are required and the product usually will be unsatisfactory not only from the standpoint of tensile strength but also from the standpoint of other physical properties. However, a polytetrafluoroethylene powder rated at a high reduction ratio can be satisfactorily extruded at a reduction ratio much lower than the reduction ratio rating.

The following specific examples of the process of the invention will further illustrate the process and the product obtained thereby.

An apparatus 10 was set up as described with reference to FIG. 1 with the extruder barrel and die at temperatures approximately 100° F. in a machine equipped to take a preform 1" in diameter. A paste of "T6C Teflon", having a reduction ratio rating of 3000/1 and having 17% by weight of V.M & P. naphtha was formed into a preform 1"×18" in length and loaded into the barrel of the extruder 12. The die 14 employed had a land 15 inside diameter of 0.041", approximately 3/16" long. Needle tip 13a had an outside diameter of 0.020" and an inside diameter of 0.10". A 33 AWG silver plated copper conductor (D=0.0071") was employed as wire W. The extruder reduction ratio was about 582/1. Grooves 30 and 31 each had a radius of 0.020". Ovens 16 and 17 were identical, and each was a 10' length having 2" inside diameter. Oven 18 was made up of two such 10' lengths. Oven 16 and oven 17 were each heated to 500° F., and oven 18 was heated to 700° F.

Extrusion was commenced with both wire W and tubing T being extruded at the same speed of 40' per minute. When extrudate T was passing completely through the apparatus set up, rolls 30 and 31, which had not theretofore been touching the extrudate were brought into contact with it at the normal speed of 40' per minute. Capstan 22 was then brought up to 130' per minute, over a 20 to 30 second period. The tip 13a of needle 13 was adjusted in land 15 to a position at which wire W was just tight in the final sintered wire. As extrusion continued, the product cable C which was so manufactured had a polytetrafluoroethylene insulation F with 70% voids and an outside diameter of 0.032", as compared with 0.035" which would have resulted in the absence of any sintering.

The cable C so manufactured had low density sintered polytetrafluoroethylene insulation F which was tightly adhered to wire W. Adjustment of the needle tip 13a controlled such tightness. Once the position of tip 13a was determined, it was not necessary to reposition it for additional runs under the same speed conditions.

Other runs were also made using the same apparatus set up (but with different adjustment of tip 13a) at extrusion speeds of 25 and 30 feet per minute and wire W speeds of 80 and 100 feet per minute, respectively.

The insulation F was found to be continuous, without breaks as in the case of wrapped tape, with uniform density from the center out to the surface. The surface of insulation F was smooth and of uniform diameter. Although containing 70% voids, the appearance in section was homogeneous.

In another similar test using T6C polytetrafluoroethylene with a reduction ratio rating of 3000/1, an extruder reduction ratio of about 584/1 and extrusion and wire speeds which provided a stretch of 196%, it was found that the matrix tensile strength of the wire insulation was about 11,600 p.s.i. However, by reducing the extruder reduction ratio, the matrix tensile strength can be reduced, e.g., to below 10,000 p.s.i.

Although no modification was required of the conventional apparatus to enable control of speed of the unsintered product as it entered sintering oven 18, this would not necessary be the case. If wire W were not present, for example, in the instance of manufacturing coreless tubing, the embodiment illustrated in FIG. 5 may be used. Where the ovens are all in-line, pinch rolls like pinch rolls 30 and 31, but synchronized with capstan 22, can be used to prevent stretching in oven 18.

Numerous tests of the process described hereinbefore and the following tables setting forth the results of some of such tests will illustrate the effect of reduction ratio rating on the matrix tensile strength of the extruded polytetrafuoroethylene:

TABLE I

| Test | ptfe powder | Naptha % | Reduction Ratio Rating | Extruder Reduction Ratio | Specific Gravity | Break Strength lbs. | Type | Wire size inches |
|---|---|---|---|---|---|---|---|---|
| (1) | *F-201 | 17% | 4000 | 375 | 0.4681 | 3.8 | co-ax braided shield | 0.012 |
| (2) | F-201 | 19% | 4000 | 381 | 0.6335 | 2.0 | wire with single drain wire | 0.0071 |
| (3) | **CD-123 | 18% | 300 | 584 | 0.7675 | 4.9 | three wire | 0.0071 |
| (4) | F-201 | 19% | 4000 | 584 | 0.7025 | 1.95 | three wire | 0.0071 |
| (5) | ***T6C | ≈18% | 3000 | 584 | — | — | three wire | — |
| (6) | F-201 | 19% | 4000 | 646 | 0.5346 | 3.4 | flat cable 5 cond. + drain wire | 0.0485 |
| (7) | F-201 | 17% | 4000 | 867 | 0.8203 | 1.2 | wire with single drain wire | 0.0103 |

*F-201 grade polytetrafluoroethylene powder sold by Daikin Kogyo Co., Ltd.
**CD-123 grade polytetrafluoroethylene powder sold by ICI United States, Inc.
***Previously identified

TABLE II

| Test | ptfe powder | Reduction Ratio Rating | Extruder Reduction Ratio | Stretch % | Apparent Tensile psi | Matrix Tensile psi | Time Delay Nanosec per ft. | Velocity of prop. % | Impedance ohms |
|---|---|---|---|---|---|---|---|---|---|
| (1) | F-201 | 4000 | 375 | 359 | 933 | 4,186 | 1.16 | 87.6 | 95 |
| (2) | F-201 | 4000 | 381 | 239 | 1,561 | 5,299 | 1.20 | 84.7 | 92 |
| (3) | CD-123 | 300 | 584 | 180 | 7,102 | 19,986 | — | — | — |
| (4) | F-201 | 4000 | 584 | 206 | 2,596 | 7,649 | 1.16 | 87.6 | 82 |
| (5) | T6C | 3000 | 584 | 196 | — | 11,600 | — | — | — |
| (6) | F-201 | 4000 | 646 | 302 | 1,927 | 7,751 | 1.15 | 88.4 | 85 |
| (7) | F-201 | 4000 | 867 | 162 | 3,018 | 7,726 | 1.26 | 80.8 | 52 |

From an examination of the foregoing Tables I and II, it will be apparent that when the reduction ratio rating of the polytetrafluoroethylene powder is high and the extruder reduction ratio is low, matrix tensile strengths for the insulation below 12,000 p.s.i. can be obtained. Also, the greater the ratio between the reduction ratio rating of the powder to the reduction ratio rating of the extruder, the lower the matrix tensile strength will be. On the other hand, test No. (3) illustrates that with an extruder reduction ratio greater than the reduction ratio rating of the polytetrafluoroethylene powder, the matrix tensile strength of the insulation far exceeds 12,000 p.s.i., namely, is 19,986 p.s.i.

In addition, the data in the Tables I and II indicate that with a high reduction ratio rating for a polytetrafluoroethylene powder, e.g. 4000/1, the extruder reduction ratio preferably is less than one-fourth the polytetrafluoroethylene powder reduction ratio, but the matrix tensile strength is also affected by the amount of stretching. Compare tests Nos. (1) and (2) and tests Nos. (6) and (7). Furthermore, from the data presented in Tables I and II, it will be noted that although the amount of stretching does not affect a substantial change in the signal time delay, it causes a significant effect with respect to the velocity of propagation.

For the foregoing reasons, it is preferred that the extruder reduction ratio be less than one-fourth the reduction ratio rating of the polytetrafluoroethylene reduction ratio rating and that the amount of stretch be at least 150%.

It has also been observed that the matrix tensile strength of the insulation can be reduced by increasing the amount of volatile extrusion aid, or lubricant, contained in the preform. However, to avoid other difficulties, the lubricant content preferably does not exceed about 24% by weight of the weight of the polytetrafluoroethylene.

Although the invention has been described in connection with sintered products, tubing and cable insulation produced in accordance with the process of the invention are useful without sintering, and in such case, the sintering step would be omitted.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows, 1. A method of forming an elongated tubular product of low density, low matrix tensile strength, polytetrafluoroethylene which comprises:

A. forcing an extrusible mixture of unsintered, high reduction ratio rating polytetrafluoroethylene and extrusion aid through a die of an extruder with a low reduction ratio, while substantially reducing the cross-section of said mixture and forming a central opening in said mixture to extrude an elongated continuous tube formed of said extrusible mixture, said high reduction ratio rating being at least 1000/1 and the reduction ratio of said extruder being less than said reduction ratio rating and being selected to provide a matrix tensile strength for the extruded polytetrafluoroethylene in the range from about 900 psi to about 12,000 psi;

B. controlling the linear speed of said tube exiting from said die to hold the volumetric rate thereof at approximately the volumetric rate of said mixture passing through said die;

C. thereafter passing said tube in sequence through an extrusion aid removal zone and a stretching zone;

D. drawing said tube through said stretching zone at a speed in excess of the linear speed of said mixture exiting from said die to stretch the tube in said stretching zone;

E. maintaining conditions in said extrusion aid removal zone effective to remove the extrusion aid in said mixture as said tube is passed through said extrusion aid removal zone; and F. heating said tube in said stretching zone to a temperature above that in said extrusion aid removal zone but less than the sintering temperature of the polytetrafluoroethylene.

2. A method according to claim 1 wherein after passing said tube through said extrusion aid removal zone, and through said stretching zone, the tube is passed through a sintering zone which is maintained at sintering temperature conditions.

3. A method according to claim 1 or 2 which further includes maintaining the linear speed of said tube entering said sintering zone at substantially the same speed as that of said tube exiting said sintering zone.

4. A method according to claim 3 in which said linear speed of said tube exiting said die is controlled by passage between a pair of pinch rolls in peripheral rolling contact with said tube.

5. A method according to claim 1 or claim 2 in which said extrusion aid is a volatile substance and said conditions in said extrusion aid removal zone include a temperature sufficient to volatilize said extrusion aid as said tube passes through said extrusion aid removal zone, and said temperature of said tube in said stretching zone is between 250° F. and 450° F.

6. A method according to claim 5 in which said extrusion aid is V M.&P. naphtha.

7. A method as set forth in claim 2 wherein said tube is pulled at the downstream end of said sintering zone by first pulling means and is stretched in said stretching zone by pulling means intermediate said stretching zone and said sintering zone by second pulling means which pulls said tube at substantially the same speed as it is pulled by said first pulling means.

8. A method as set forth in claim 1 or 2 wherein an indefinite length of material which is inextensible relative to said tube is supplied to said central opening in said mixture and through said die into said tube and said tube with said indefinite length of said material therein is drawn through said stretching zone and said sintering zone.

9. A method as set forth in claim 8 wherein said indefinite length of material is an electric conductor.

10. A method as set forthin claim 1 or 2 wherein said reduction ratio rating is at least 2500/1 and the reduction ratio of said extruder is in the range from about 200/1 to about 800/1.

11. A method as set forth in claim 10 wherein the reduction ratio of said extruder is less than one fourth of said reduction ratio rating and said tube is stretched at least 150%.

12. An electric cable comprising an elongated inner conductor and a continuous non-tape extruded layer of stretched, low density, sintered, fibrous and porous polytetrafluoroethylene surrounding and contacting said conductor, said polytetrafluoroethylene having a reduction ratio rating of at least 1000/1 and said layer having a uniform cross-section and density in both the longitudinal and radial directions, being continuous in the circumferential and radial directions, and being substantially homogeneous as viewed in cross-section, having a density of from about 0.45 g/cm$^3$ to about 1.9 g/cm$^3$ and having a matrix tensile strength not greater than 12,000 psi.

13. A cable as set forth in claim 12 in which said polytetrafluoroethylene contains 70% voids.

14. A cable as set forth in claim 13 wherein the electrical signal propagation velocity of said layer is at least 75% of the velocity of light.

15. A cable as set forth in claim 14 wherein said electrical signal propagation velocity is at least 80% of the velocity of light and said matrix tensile strength is in the range from about 2000 p.s.i. to 8000 p.s.i.

16. A cable as set forth in claim 12 wherein said polytetrafluoroethylene has a reduction ratio rating of at least 1000/1.

* * * * *

UNITED STATES PATENT AND TRADEMARK OFFICE
CERTIFICATE OF CORRECTION

PATENT NO. : 4,826,725
DATED : May 2, 1989
INVENTOR(S) : Harlow

It is certified that error appears in the above-identified patent and that said Letters Patent is hereby corrected as shown below:

```
Col. 1, line 40, "microprocess" should read --microporous--;
Col. 2, line 25, "ibrous" should read --fibrous--;
Col. 7, line 37, "mus" should read --must--;
Col. 9, line 44, after "than" please insert
    --1000/1, and preferably, less than 800/1, for
    extruding the poly- --.
Col. 10, line 67, "openinqs" should read --openings--;
Col. 16, line 10, "forthin" should read --forth in--.
```

Signed and Sealed this

Twentieth Day of March, 1990

*Attest:*

JEFFREY M. SAMUELS

*Attesting Officer*        *Acting Commissioner of Patents and Trademarks*